United States Patent [19]

Ohsaka et al.

[11] Patent Number: 5,023,495

[45] Date of Patent: Jun. 11, 1991

[54] MOVING-MAGNET TYPE LINEAR D.C. BRUSHLESS MOTOR HAVING PLURAL MOVING ELEMENTS

[75] Inventors: Masayuki Ohsaka, Sagamihara; Osami Miyao, Yamato, both of Japan

[73] Assignee: Hitachi Metals & Shicoh Engine, Japan

[21] Appl. No.: 509,760

[22] Filed: Apr. 17, 1990

[51] Int. Cl.$^5$ .................................. H02K 41/02
[52] U.S. Cl. ............................. 310/12; 310/14; 310/13; 310/135
[58] Field of Search ............... 310/12, 13, 14, 15; 318/135, 37, 38, 115

[56] References Cited

U.S. PATENT DOCUMENTS 4,151,447  4/1979  van der Heide et al. ............. 310/12
4,620,253 10/1986  Garwin et al. ..................... 318/135

FOREIGN PATENT DOCUMENTS 86474  5/1984  Japan .................................. 310/12

Primary Examiner—Peter S. Wong
Assistant Examiner—Matthew Nguyen
Attorney, Agent, or Firm—Finnegan, Henderson, Farabow, Garrett & Dunner

[57] ABSTRACT

A moving-magnet type linear d.c. brushless motor having plural moving elements on a traveling track, and including a stator armature on the traveling track; n moving elements, each including a thrust-generating field magnet having P contiguous magnetic poles of alternating N and S polarity, where n is an integer greater than 1 and P is an integer of at least 1, the moving elements having one side facing the stator armature and traveling separately and independently along the traveling track; a plurality of position-detecting magnets, each corresponding to a different one of the moving elements and having P magnetic poles of N and S polarity at in-phase positions of substantially the same pitch relative to the poles of the thrust-generating magnets; and position detecting means including a group of position sensors corresponding to each position-detecting magnet for generating an electric current in the stator armature to move the moving elements in predetermined directions separately and independently, each position sensor detecting the magnet poles of only the corresponding position-detecting magnet.

9 Claims, 6 Drawing Sheets

FIG. 2

MOVING-MAGNET TYPE LINEAR D.C. BRUSHLESS MOTOR HAVING PLURAL MOVING ELEMENTS

BACKGROUND OF THE INVENTION

1) Field of the Invention

This invention relates to a moving-magnet type linear d.c. brushless motor, which is one linear d.c. brushless motor in itself, but has plural moving elements.

2) Description of the Related Art

In small-size and high-precision linear d.c. brushless motors, there are moving-magnet type linear d.c. brushless motors having one moving element provided with a field magnet, which has P (P being an integer of 1 or higher) contiguous magnetic poles of alternating N and S polarity, and a stator armature arranged on a position of the stationary side facing the field magnet of the moving element through an air gap and a position sensor, which is a magnetoelectric transducer as a pole-discriminating sensor for the field magnet and is disposed on the stator armature.

As a result of a recent technical demand, not only one moving element but plural moving elements have however been required in some instances.

However, this is not so simple as a plurality of moving elements can be caused to travel separately and independently under control if the number of moving elements is only increased to a plurality in order to satisfy such a demand.

Namely, it is necessary to servocontrol the plural moving elements separately and independently with respect to different-speed moving, positioning and the like so as to drive them. However, since a position sensor provided on the stator armature detects the predetermined magnetic pole of field magnets in the plural moving elements, the plural moving elements will simultaneously travel arbitrarily if electric currents should be fed to their corresponding armature coils at the same time, resulting in troubles such as their collision.

When an attempt to make use of electric circuits is made in order to avoid such troubles, systems for a positioning control circuit, software of a microcomputer, etc. for such a purpose become very complex, so that the final cost becomes greatly higher and besides, such systems are unsuitable for practical use.

In addition, since the plural moving elements are required to be driven separately and independently under control, in some cases, they may be caused to travel in separate and independent traveling modes different from one another or alternatively, some of them may be caused to travel and the remainder may be caused to stop. In such cases, it is necessary to consider a sufficient counterplan for the above troubles.

Here, in order to separately detect the position and speed of the plural moving elements, it is necessary to provide a plurality of displacement detecting means such as encoders for detecting the movement of the moving elements corresponding thereto.

Incidentally, if the above-described encoders, power circuits and microcomputer are used upon driving the individual moving elements, the plural moving elements can be driven separately and independently under servocontrol by feeding electric currents to a group of armature coils of the stator armature, which face the field magnets of the plural moving elements, in predetermined directions even if no group of position sensors are present.

The linear d.c. brushless motor of the type making no use of any position sensors as described above is useful because groups of position sensors such as many expensive Hall elements can be omitted and it can hence be fabricated economically.

The linear d.c. brushless servomotor of the type making no use of any position sensors has the abovedescribed merits. On the other hand, it is however accompanied by defects due to the absence of position sensors groups compared with the linear d.c. brushless motor making use of the position sensors.

Namely, compared with the linear d.c. brushless motor making use of the position sensors, the linear d.c. brushless servomotor of the type making no use of the position sensors is little in reliability from a viewpoint of starting characteristics due to the absence of the position sensors. In addition, it is also accompanied by the same defect as described above from the influence of load characteristics. Accordingly, such a brushless servomotor is yet in the stage where a further improvement must be brought about.

Moreover, in the case where a plurality of moving elements are present, the linear d.c. brushless servomotor of the type making no use of the position sensors becomes very complex in electric circuit or software compared to the case of single moving element. It is hence accompanied by a defect that difficulties are encountered on the achievement of the desired purpose.

This is due to the fact that the linear d.c. brushless servomotor of the type making no use of the position sensors is not yet thoroughly studied and developed at this point of time.

Therefore, in order to control separately and independently the plural moving elements, the present inventor has used a system making use of position sensors in a moving-magnet type linear d.c. brushless motor of a polypolar polyphase system making use of plural moving elements, which have each a polypolar field magnet, and of numerous armature coils even if such a system is somewhat expensive in mechanical construction only for the cost of the position sensors.

In the case of the linear d.c. brushless motor making use of the position sensors as described above and having the plural moving elements, if the motor should be of the conventional type, the plural moving elements will move arbitrarily, resulting in a cause of troubles. Accordingly, the present inventor attempted first of all to use two moving elements and to provide with a first group of position sensors for detecting only a magnetic pole of a field magnet in a first moving element and a group of second position sensors for detecting only a magnetic pole of a field magnet in a second moving element so as to avoid the simultaneous movement of the first and second moving elements.

In one example thereof, it was possible to avoid the simultaneous movement by switching the first group of the position sensors and the second group of the position sensors from each other by a mechanical change-over switch in accordance with signals from a controller. However, such a method was accompanied by a defect that the mechanism of the change-over switch becomes complex and the cost of the motor hence comes high. In addition, when the number of the moving elements is at most 2, this method becomes possible because two groups of the position sensors can be arranged respectively on both sides of a stator armature.

However, when the number of the moving elements becomes three or more, such a motor is accompanied by improper operation because some groups of the position sensors, which are used respectively for plural moving elements, must be arranged on the same side. It was hence difficult to construct a linear d.c. brushless motor having plural moving elements as a matter of fact.

SUMMARY OF THE INVENTION

It is a principal object of this invention to provide a moving-magnet type linear d.c. brushless motor, which is one linear d.c. brushless motor in itself, but has plural moving elements, wherein even when supposing the number of the moving element is n, n groups of position sensors are respectively provided corresponding to n moving elements so as to permit separate and independent speed-control and positioning of the moving elements, each of the position sensor groups for the moving elements is allowed to output only the signals obtained by detecting a magnetic pole of a field magnet in its corresponding moving element without any wrong operation, so that an electric current is fed to a stator armature facing the thrust-generating field magnet of the predetermined moving element in a desired manner so as to cause the moving element to generate thrust in a predetermined direction; the plural moving elements can be driven separately and independently, so that troubles such as wrong operation and mechanical trouble can be obviated; and if provided with such means, it can be fabricated economically because such means are very simple.

Such an object of this invention can be essentially achieved by providing a moving-magnet type linear d.c. brushless motor having plural moving elements, which comprises:

a stator armature provided along a traveling track of moving elements;

$n_1$th, ... and $n_n$th moving elements, which have each a thrust-generating field magnet having P contiguous magnetic poles of alternating N and S polarity, where n is an integer of at least 1 and P is an integer of at least 1, face to face with the stator armature, and can travel separately and independently;

$n_1$th, ... and $n_n$th position-detecting magnets, which are provided respectively on said $n_1$th, ... and $n_n$th moving elements and each have P magnetic poles of N and S polarity at in-phase position relative to the thrust-generating field magnets and almost the same pitch as that between the N and S magnetic poles in each of the thrust-generating field magnets; and $n_1$th, ... and $n_n$th groups of position sensors, which face respectively said $n_1$th, ... and $n_n$th position-detecting magnets, serve respectively said $n_1$th, ... and $n_n$th moving elements, and provided on the side of the stator armature in such a manner that one sensor group facing one position-detecting magnet does not detect any magnetic poles of the position-detecting magnets provided on other moving elements, so that when said $n_1$th, ... or $n_n$th group of the position sensors detect a magnetic pole of its corresponding position-detecting magnet, in accordance with signals from said $n_1$th, ... or $n_n$th group of the position sensors, an electric current is caused to flow into the stator armature facing the thrust-generating field magnet of said $n_1$th, ... or $n_n$th moving element having said detected $n_1$th, ... or $n_n$th position-detecting magnet so as to generate thrust, which is caused to move said detected moving element in a predetermined direction, whereby said $n_1$th, ... and $n_n$th moving elements are energized and controlled separately and independently so as to cause them to travel.

Other objects of this invention can be accomplished by the following means: (1) the above-described thrust-generating field magnets are also used as said position-detecting magnets without separately providing any position-detecting magnets; (2) in the means (1), first and second two moving elements, which can move separately and independently, are provided as the above-described moving elements, first and second thrust-generating field magnets provided respectively on said two moving elements are also used as position-detecting magnets, a group of first position sensors are provided on one side of the above-described stator armature so as to detect only the N or S magnetic pole of the first thrust-generating field magnet-cum-position-detecting magnet in the first moving element, so that when the first group of the position sensors detect an N or S pole of the first thrust-generating field magnet-cum-position-detecting magnet in the first moving element, an electric current is caused to feed to the stator armature facing the field magnet in the first moving element so as to generate thrust by which the first moving element is caused to travel in a predetermined direction, and a group of second position sensors are provided on the other side of the above-described stator armature so as to detect only the N or S magnetic pole of the second thrust-generating field magnet-cum-position-detecting magnet in the second moving element, so that when the second group of the position sensors detect an N or S pole of the second thrust-generating field magnet-cum-position-detecting magnet in the second moving element, an electric current is caused to feed to the stator armature facing the field magnet in the second moving element so as to generate thrust by which the second moving element is caused to travel in a predetermined direction; (3) in the means (2), the above first thrust-generating field magnet-cum-position-detecting magnet provided on the first moving element is arranged on the first moving element with it shifted in the direction of one side of the stator armature and the above second thrust-generating field magnet-cum-position-detecting magnet provided on the second moving element is arranged on the second moving element with it shifted in the direction of the other side of the stator armature; (4) in the means (1), first and second two moving elements are provide as the moving elements, respective thrust-generating field magnets provided on the first and second moving elements are arranged so as to be located on the same traveling track without shifting their positions from each other in directions perpendicular to the traveling direction of the moving elements, the first moving element is constructed so as to emit leakage magnetic flux from one side of its thrust-generating field magnet, but not to emit leakage magnetic flux from the other side thereof, the second moving element is constructed so as not to emit leakage magnetic flux from one side of its thrust-generating field magnet, but to emit leakage magnetic flux from the other side thereof, a group of first position sensors are provided on one side of the stator armature so as to detect only the leakage magnetic flux of N or S polarity, which is emitted from the thrust-generating field magnet in the first moving element, so that when the first group of the position sensors detect the leakage magnetic flux of an N or S pole, which is emitted from the thrust-generating field magnet in the first moving element, an electric current is cause to feed to the stator armature facing the thrust-generating field magnet in the first moving element so as to generate thrust by which the first moving element is caused to travel in a predetermined direction, and a group of second position sensors are provided on the other side of the stator armature so as to detect only the magnetic flux of N or S polarity, which is emitted from the other side of the thrust-generating field magnet in the second moving element, so that when the second group of the position sensors detect the leakage magnetic flux of an N or S pole, which is emitted from the thrust-generating field magnet in the second moving element, an electric current is cause to feed to the stator armature facing the thrust-generating field magnet in the second moving element so as to generate thrust by which the second moving element is caused to travel in a predetermined direction; (5) in the means (1), each of the above-described $n_1$th, ... and $n_n$th position-detecting magnets is provided at a position on its corresponding moving element in such a manner that the traveling tracks according to traveling of the moving elements are in positions different from one another, and said $n_1$th, ... and $n_n$th groups of position sensors are separately provided at positions different from one another on the side of the stator armature so as to face said $n_1$th, ... and $n_n$th position-detecting magnets respectively, so that each of the position sensor groups detects its corresponding position-detecting magnet alone; and (6) in the means (5), each of the above-described $n_1$th, ... and $n_n$th position-detecting magnets is provided at a position on its corresponding moving element in such a manner that the traveling tracks according to traveling of the moving elements are in positions different from one another, and said $n_1$th, ... and $n_n$th groups of position sensors are separately provided at positions different from one another on the side of the stator armature so as to face said $n_1$th, ... and $n_n$th position-detecting magnets respectively, and with magnetically isolated from position-detecting magnets other than its corresponding position-detecting magnet, so that each of the position sensors detects its corresponding position-detecting magnet alone.

Other objects, features and advantages of the present invention will become apparent from the following description and the appended claims, taken in conjunction with the accompanying drawings.

BRIEF DESCRIPTION OF THE DRAWINGS

In the accompanying drawings:

FIG. 2 is an explanatory illustration of both power circuit and position-detecting mechanism for one phase;

DETAILED DESCRIPTION OF THE INVENTION AND PREFERRED EMBODIMENTS

First Embodiment of the Invention

Figure 1:
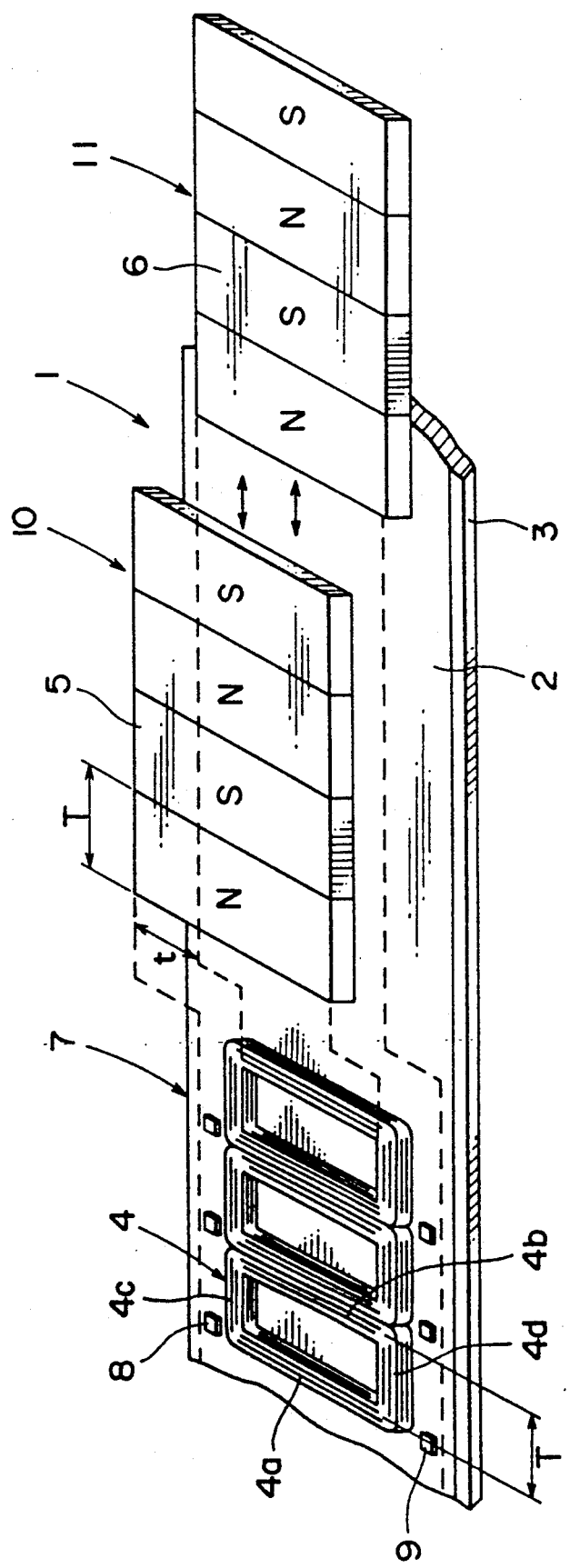
FIG. 1 is an exploded perspective view showing a principal part to illustrate the first embodiment of this invention.
Figure 2:
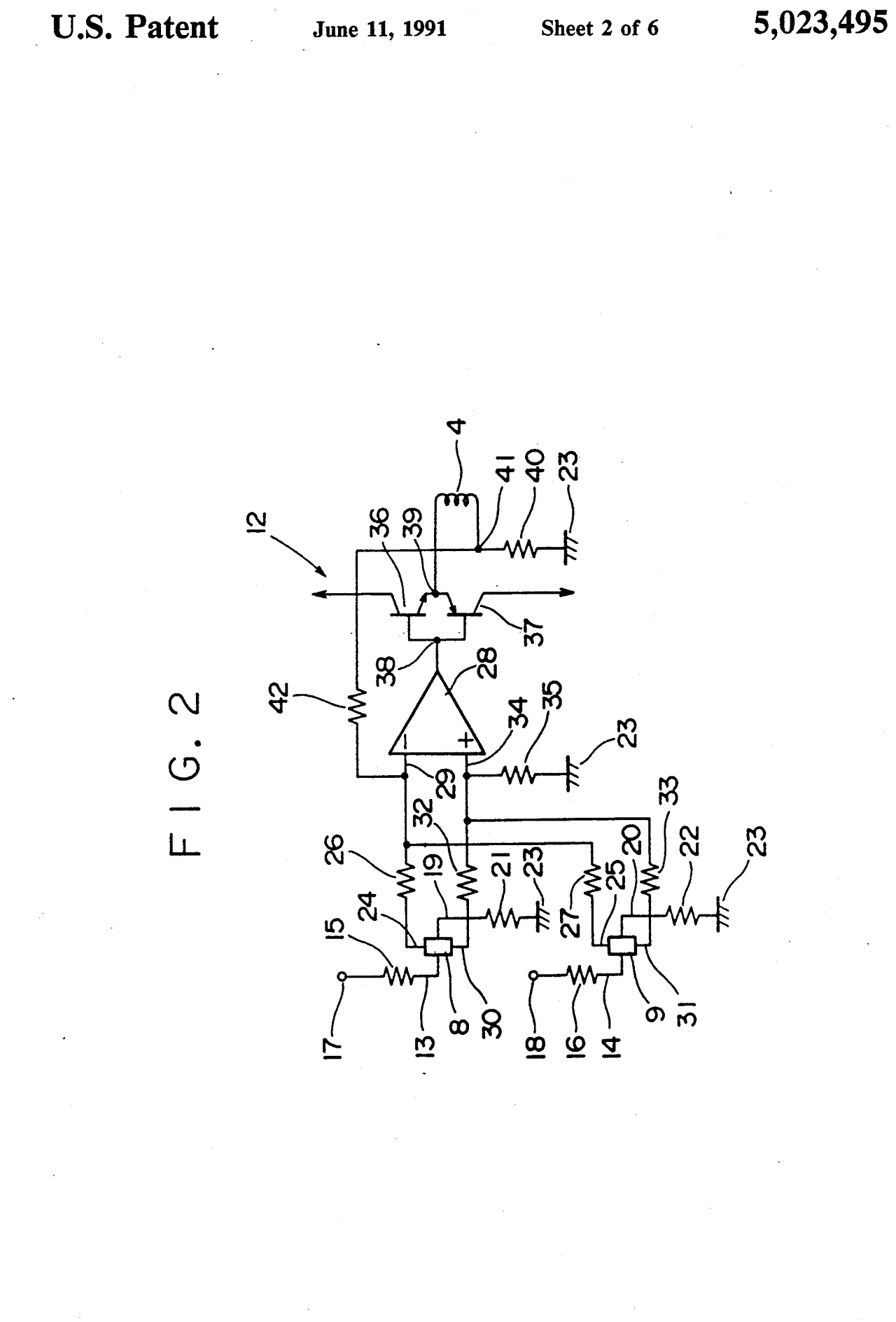

FIG. 1 is a perspective view showing only a principal part of a moving-magnet type linear d.c. brushless motor having two moving elements to illustrate the first embodiment of this invention and FIG. 2 diagrammatically illustrates both power circuit and position-detecting mechanism for one phase in the linear d.c. brushless motor.

The first embodiment of this invention will hereinafter be described with reference to FIGS. 1 and 2.

A moving-magnet type linear d.c. brushless motor 1 having two moving elements is provide with a stator base 2 in the form of a long board, said stator base being composed of a magnetic material and constituting a stator yoke.

On both sides of the stator base 2 are integrally formed projecting edges 3 for linear guide, each of which projects outside and has a triangular form in cross section. They construct a linear guide.

A printed circuit board in the form of a long board, which is not illustrated, is arranged on the upper surface of the stator base 2. A group of coreless armature coils 4 in the form of a rectangular frame are contiguously arranged on the printed circuit board in a close contact with one another so as not to overlap, so that a coreless stator armature 7 is composed along traveling tracks of thrust-generating field magnets 5,6 which will be described subsequently and compose respectively first and second moving elements 10,11. Incidentally, the thrust-generating field magnet 5 or 6 will hereinafter be called "thrust-generating field magnet-cum-position-detecting magnet" because it is caused to combine the function of a position-detecting magnet in this embodiment.

When the printed circuit board is not used, it is necessary to arrange the group of the coreless armature coils 4 on the upper surface of the stator base 2 by a suitable means after subjecting the upper surface of the stator base 2 to an insulating treatment by a suitable means.

The group of the coreless armature coils 4 will hereinafter be described. It is composed by contiguously arranging coreless armature coils 4, which have been formed by reciprocally winding a wire so as to shape an air-core type rectangular frame, on the stator base 2 so as not to overlap with one another.

However, the stator armature 7 does not necessarily require such a coreless structure, but may also be composed by a printing or plating means, or from sheet coils. Alternatively, a stator armature of a core structure may be used. It is only necessary to design and choose a suitable stator armature from among these in consideration of circumstances such as specification and cost.

In this embodiment, a drawing in which only three coreless armature coils 4 are arranged is given for reasons of the preparation of drawings. However, in practice, many coreless armature coils 4 are contiguously arranged at the above-illustrated position so as not to overlap with one another. Although a case where the coreless armature coils 4 do not overlap with one another is illustrated in this embodiment, whether the coreless armature coils overlap with one another or not offers no particular problem in this invention, but either mode may be used. However, this embodiment will be described by illustrating the case where the coreless armature coils 4 have been arranged so as not to overlap with one another.

According to this group of the air-core type coreless armature coil 4, each of the coreless armature coils 4 is formed by winding a wire in such a manner that supposing the width of one magnetic pole in the thrust-generating field magnet-cum-position-detecting magnet 5,6 is T, an interval between available conductor portions 4a and 4b, which extend in a direction perpendicular to a traveling direction of the thrust-generating field magnet-cum-position-detecting magnet 5,6 and contribute to the generation of thrust, is equal to the width T of said one magnetic pole so that a linearly reciprocating-180 degree energizing system good in efficiency and performance can be used. Incidentally, in the coreless armature coil 4, conductor portions 4c and 4d parallel to the traveling direction of the moving element 10 or 11 are conductor portions which do not contribute to the generation of thrust except for conductor portions crossing with the available conductor portions 4a and 4b.

A first group of position sensors 8 and a second group of position sensors 9 are arranged on the stator armature 7 composed by arranging a number of the coreless armature coils 4 on the stator base 2. The position sensors 8 and 9 may be transducers such as Hall IC devices, Hall elements or magnetoresistive elements. These magneto-electric transducers can discriminate magnetic poles of N and S polarity in the thrust-generating field magnet-cum-position-detecting magnets 5 and 6. In this embodiment, Hall elements are used. In order to make the thrust ripple of the linear d.c. brushless motor 1 smooth to improve its performance, the groups of the position sensors 8 and 9 are arranged respectively on both sides of the stator base 2 and at positions on lines of extending one of the available conductor portions 4a (or 4b may be chosen) of the armature coils 4, which contribute to the generation of thrust so as to be located at an in-phase position to the conductor portions 4a. Namely, each of the first position sensors 8 is arranged on one side of the stator base 2 and at a position on the extended line of one available conductor portion 4a of its corresponding armature coil 4, which contributes to the generation of thrust, so as to permit the detection of the magnetic pole of N or S polarity only of the first thrust-generating field magnet-cum-position-detecting magnet 5 provided on the lower surface of the body (not illustrated) of the first moving element 10. Each of the second position sensors 9 is arranged on the other side of the stator base 2 and at the position on the extension line of one available conductor portion 4a of its corresponding armature coil 4, which contributes to the generation of thrust, so as to permit the detection of the magnetic pole of N or S polarity of only the second thrust-generating field magnet-cum-position-detecting magnet 6 provided on the lower surface of the body (not illustrated) of the first moving element 11.

Each of the first moving element 10 having the first thrust-generating field magnet-cum-position-detecting magnet 5 and the second moving element 11 is supported along the longitudinal direction of the stator base 2 by rotatably attaching guide rollers (not illustrated) respectively to both sides of a field magnet-supporting member (not illustrated) and causing the guide rollers to engage with the projecting edge 3 for linear guide, which have been formed on both sides of the stator base 2.

Namely, the linear guide is composed by the guide rollers (not illustrated) provided respectively on the first and second moving elements 10,11 and the edges 3 for linear guide, which have been formed on both sides of the stator base 2.

Since the conductor portions 4c,4d in the coreless armature coil 4 do not contribute to the generation of thrust except for their corners as described above, thrust-generating field magnet-cum-position-detecting magnets whose breadth is shorter than the length of the armature coil 4 by the width of the conductor portion 4c or 4d may be used as the thrust-generating field magnet-cum-position-detecting magnets 5 and 6.

Here, conductor portions of the corners where the conductor portions 4a and 4c as well as the conductor portions 4b and 4d cross with each other may also contribute to the generation of thrust though the extent is minimal. For this reason, those having a breadth equal to the length of the coreless armature coil 4 are used as the thrust-generating field magnet-cum-position-detecting magnets 5,6 in this invention so as to permit the generation of greater thrust. Accordingly, unless some measures are taken, both groups of the first and second position sensors 8,9 will detect the magnetic pole of N or S polarity of the first and second thrust-generating field magnet-cum-position-detecting magnets 5,6 at the same time, resulting in arbitrary traveling of the first and second moving elements 10,11. In this invention, in order to prevent such arbitrary traveling, the thrust-generating field magnet-cum-position-detecting magnet 5 is arranged on the body (not illustrated) of the first moving element 10 with it shifted by a predetermined interval (the width of the conductor portion 4d in the coreless armature coil 4) in a direction of one side of the stator armature 7 so that the second group of the position sensors 9 do not detect any magnetic poles of the first thrust-generating field magnet-cum-position-detecting magnet 5 to cause it to face the stator armature 7 composed by the group of the coreless armature coils 4 on the stator base 2 through an air-gap in the axial direction. Namely, when the first thrust-generating field magnet-cum-position-detecting magnet 5 is fitted to the body (not illustrated) of the first moving element 10, it is only necessary to fix a first thrust-generating field magnet-cum-position-detecting magnet 5, whose the other edge is located inside the conductor portion 4d of the coreless armature coil 4 and whose one edge has been formed into a required length in a state extended to the direction of one side of the stator armature 7 so that the first group of the position sensors 8 can detect the magnetic pole or magnetic field near said one edge thereof, to the body of the first moving element 10. The first thrust-generating field magnet-cum-position-detecting magnet 5 is thus provided fixedly on the body of the first moving element 5 with it shifted by the predetermined interval (the width of the conductor portion 4d in the coreless armature coil 4) in the direction of said one side of the stator armature 7 as described above.

Similarly, the thrust-generating field magnet-cum-position-detecting magnet 6 is arranged on the second moving element 11 with it shifted by a predetermined interval (the width of the conductor portion 4c in the coreless armature coil 4) in a direction of the other side of the stator armature 7 so that the first group of the position sensors 8 do not detect any magnetic poles of the second thrust-generating field magnet-cum-position-detecting magnet 6, and is caused to face the stator armature 7 composed by the group of the coreless armature coils 4 on the stator base 2 through an air-gap in the axial direction. Namely, when the second thrust-generating field magnet-cum-position-detecting magnet 6 is fitted to the body (not illustrated) of the second moving element 11, it is only necessary to fix a second thrust-generating field magnet-cum-position-detecting magnet 6, whose one edge is located inside the conductor portion 4c of the coreless armature coil 4 and whose the other edge has been formed into a required length in a state extended to the direction of the other side of the stator armature 7 so that the second group of the position sensors 9 can detect the magnetic pole or magnetic field near said the other edge thereof, to the body of the second moving element 11. The second thrust-generating field magnet-cum-position-detecting magnet 6 is thus provided fixedly on the body of the second moving element 6 with it shifted by the predetermined interval (the width of the conductor portion 4c in the coreless armature coil 4) in the direction of said the other side of the stator armature 7 as described above.

Incidentally, in order to ensure that the first group of the position sensors 8 do not detect any magnetic poles or magnetic field of the second thrust-generating field magnet-cum-position-detecting magnet 6 in the second moving element 11, a magnetic substance (not illustrated) is provided on said one side of the second thrust-generating field magnet-cum-position-detecting magnet 6. Similarly, in order to ensure that the second group of the position sensors 9 do not detect any magnetic pole or magnetic field of the first thrust-generating field magnet-cum-position-detecting magnet 5 in the first moving element 10, a magnetic substance (not illustrated) is provided on said the other side of the first thrust-generating field magnet-cum-position-detecting magnet 5.

In addition, first and second rotary encoders (not illustrated) are provided respectively for the first and second moving elements 10,11 in order to detect the speeds and displacements or positions of the first and second moving elements 10,11.

As one example for such a purpose, gears (alternatively, another suitable substitute for this) are separately attached to the shafts of the first and second encoders, and closed-loop timing belts, which separately move with the movement of the first moving element 10 and the second moving element 11, are engaged with their corresponding gears described above.

Encoder signals obtained by the first and second encoders are fed back to an energizing and controlling circuit. Command signals from a microcomputer are input into the energizing and controlling circuit. According to control signals from the energizing and controlling circuit, a power circuit feeds an electric current in a predetermined direction to a predetermined coreless armature coil 4 when an output signal from the group of the first or second position sensors 8 or 9 is input.

FIG. 2 illustrates both power circuit and position-detecting mechanism for one phase, which is provided corresponding to each phase of the coreless armature coils 4.

The power circuit and position-detecting mechanism 12 will hereinafter be described with reference to FIG. 2.

Power terminals 13 and 14 on one sides of each of the first and second position sensors 8 and 9 are respectively connected to control terminals 17 and 18, which are connected to the energizing and controlling circuit, through respective resistances 15 and 16. Power terminals 19 and 20 on a second of each of the first and second position sensors 8,9 are connected to grounds 23 through respective resistances 21 and 22. Output terminals 24 and 25 on third sides of the first and second position sensors 8,9 are respectively connected to a negative-side input terminals 29 of an operational amplifier 28 through respective resistances 26 and 27. Output terminals 30 and 31 on the fourth sides of the first and second position sensors 8,9 are respectively connected to a positive-side input terminals 34 of the operational amplifier 28 through respective resistances 32 and 33. A resistance 35 is interposed between the unction point of the resistances 32,33 and the input terminal 34 and a ground 23. The output terminal of the operational amplifier 28 is connected to the junction point 38 of respective bases of transistors 36 and 37. The collector of the transistor 36 is connected to a positive-side power source, respective emitters of the transistors 36 and 37 are connected together, and the collector of the transistor 37 is connected to a negative-side power source. A terminal on one side of a coreless armature coil 4 is connected to the junction point 39 of the respective emitter of the transistors 36 and 37 and a terminal on the other side of the coreless armature coil 4 is connected to a ground 23 through a resistance 40. A resistance 42 is interposed between the junction point 41 of the coreless armature coil and the resistance 40 and the input terminal 29.

The foregoing is an example of the power circuit and position-detecting mechanism 12 according to this invention.

Accordingly, when a control signal to the effect that the first moving element 10 is caused to move at a predetermined speed and displacement is input in the energizing and controlling circuit by a signal from the microcomputer, this control signal passed through the control terminal 17 is input in the first position sensor 8. When the first position sensor 8 then detects the magnetic pole of N or S polarity of the thrust-generating field magnet-cum-position-detecting magnet 5 provided on the first moving element 10, an output signal to that effect is output from the output terminal 24 or 30. This output signal is amplified by the operational amplifier 28 and then received by the transistor 37 or 36, whereby an electric current in a predetermined direction is caused to flow into a coreless armature coil 4. Therefore, thrust in a predetermined direction is generated by the coreless armature coil 4 and the thrust-generating field magnet-cum-position-detecting magnet 5 facing it, so that the first moving element 10 can be servocontrolled to cause it to travel under control of a feedback loop.

Similarly, when a control signal to the effect that the second moving element 11 is caused to move at a predetermined speed and displacement is input in the energizing and controlling circuit by a signal from the microcomputer, this control signal passed through the control terminal 18 is input in the second position sensor 9. When the second position sensor 9 then detects the magnetic pole of N or S polarity of the thrust-generating field magnet-cum-position-detecting magnet 6 provided on the second moving element 11, an output signal to that effect is output from the output terminal 25 or 31. This output signal is amplified by the operational amplifier 28 and then received by the transistor 36 or 37, whereby an electric current in a predetermined direction is caused to flow into a coreless armature coil 4. Therefore, thrust in a predetermined direction is generated by the coreless armature coil 4 and the thrust-generating field magnet-cum-position-detecting magnet 6 facing it, so that the second moving element 11 can be servocontrolled to cause it to travel under control of a feedback loop.

Namely, in the first embodiment of this invention, since the first group of the position sensors 8 are arranged so as to detect only the magnetic pole of the thrust-generating field magnet-cum-position-detecting magnet 5 in the first moving element 10, only the first moving element 10 can be moved. In addition, since the second group of the position sensors 9 are arranged so as to detect only the magnetic pole of the thrust-generating field magnet-cum-position-detecting magnet 6 in the second moving element 11, only the second moving element 11 can be moved. Accordingly, the first moving element 10 and the second moving element 11 can be servocontrolled separately and independently to move them.

Second Embodiment of the Invention

The above-described linear d.c. brushless motor 1 having two moving elements are very useful.

However, this linear d.c. brushless motor 1 requires to arrange the first and second thrust-generating field magnet-cum-position-detecting magnets 5 and 6, which are provided respectively on said two moving elements 10 and 11, with them shifted in directions of mutually opposing sides so that the thrust-generating field magnet-cum-position-detecting magnets 5 and 6 do not travel along the same traveling track on the stator armature. However, difficulties are encountered on their assembly and adjustment. In addition, there is a disadvantage that the breadth of the moving elements 10,11 becomes wider.

Moreover, in order to ensure that the position sensor 8 or 9, which serves one moving element 10 or 11, does not detect any poles of the thrust-generating field magnet-cum-position-detecting magnets 6 or 5 provided on the other moving element 11 or 10, accompanying constituent elements (for example, magnetic materials) must be provided or for meeting such a demand, the thrust-generating field magnet-cum-position-detecting magnets 5,6 must be arranged with them shifted respectively nearer the opposing sides. Accordingly, the moving elements 10, 11 constructed necessarily become wide in breadth and heavy as described above, and the burden of the motor hence become greater. It is therefore necessary to improve its thrust performance.

Furthermore, corresponding to the above facts, the position sensors 8,9 arranged face to face with the thrust-generating field magnet-cum-position-detecting magnets 5,6 must be arranged respectively more outside than positions of the thrust-generating field magnet-cum-position-detecting magnets 5,6. Accordingly, as the stator base 2 used therein, a stator base wider in breadth must be used.

Figure 3:
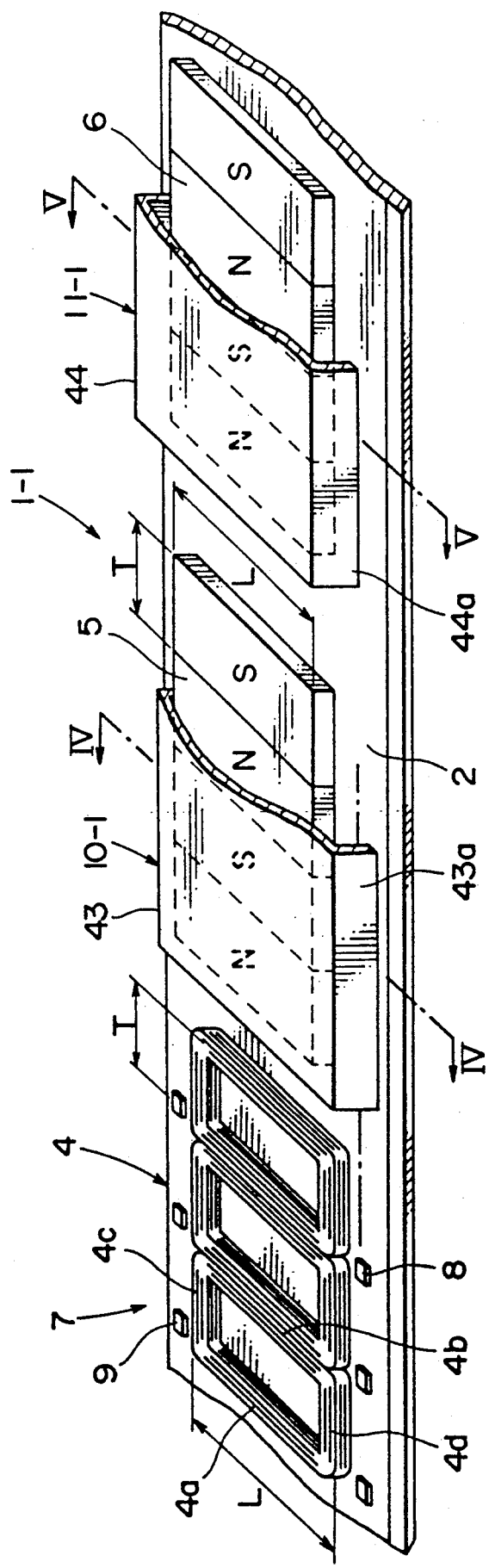
FIG. 3 is an exploded perspective view showing a principal part to illustrate the second embodiment of this invention.
Figure 4:
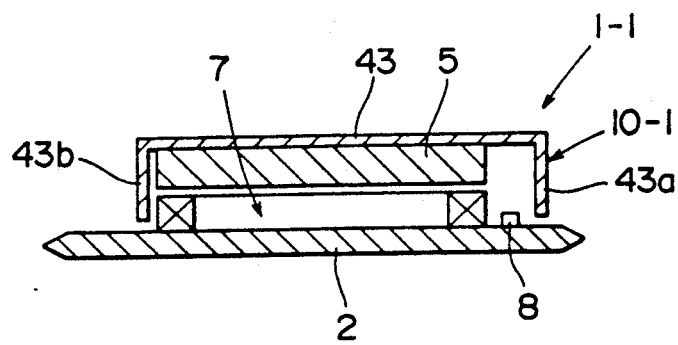
FIG. 4 is a vertical cross-sectional view taken on line IV—IV in FIG. 3.
Figure 5:
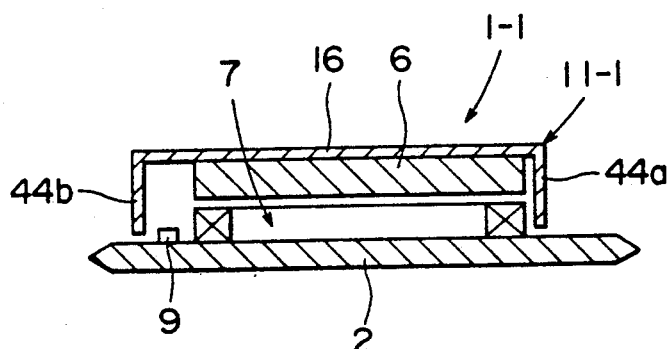
FIG. 5 is a vertical cross-sectional view taken on line V—V in FIG. 3.

A moving-magnet type linear d.c. brushless motor 1—1 having two moving elements according to the second embodiment of this invention is an improved motor of the above-described moving-magnet type linear d.c. brushless motor 1 having two moving elements. FIG. 3 is a perspective view showing only a principal part of the moving-magnet type linear d.c. brushless motor 1—1 having two moving elements according to the second embodiment of this invention, FIG. 4 is a vertical cross-sectional view taken on line IV—IV in FIG. 3, and FIG. 5 is a vertical cross-sectional view taken on line V—V in FIG. 3.

The moving-magnet type linear d.c. brushless motor 1—1 having two moving elements according to the second embodiment of this invention will hereinafter be described with reference to FIGS. 3 through 5. Incidentally, the same reference characters are given to common parts to those in the first embodiment and their description is omitted.

Similar to the motor described above in the first embodiment, the moving-magnet type linear d.c. brushless motor 1—1 having two moving elements is provide with a stator base 2 in the form of a long board, said stator base being composed of a magnetic material and constituting a stator yoke. On the upper surface thereof, a stator armature 7 composed by a group of coreless armature coils 4 is formed. Two of a first moving element 10-1 and a second moving elements 11-1 are movably attached so as to permit relative movement to the stator armature 7 through an air-gap in the axial direction.

By the way, a first field magnet-cum-position-detecting magnet 5 in the first moving element 10-1 and a second field magnet-cum-position-detecting magnet 6 in the second moving element 11-1 are fixedly provided respectively on the lower surfaces of a first movable yoke 43 in a turned square U-shape and a second movable yoke 44 in a turned square U-shape so as to travel on the same track face to face with the stator armature 7.

On one side of the stator armature 7 composed by arranging a group of many coreless armature coils 4 on the stator base 2, a first group of position sensors 8 are disposed, while a second group of position sensors 9 are arranged on the other side of the stator armature 7. Each of the first group of the position sensors 8 is arranged on one side of the stator base 2 and at a position on the extension line of one available conductor portion 4a of its corresponding armature coil 4, which contributes to the generation of thrust, so as to permit the detection of only the leakage magnetic flux of N or S polarity, which is emitted from one side of the first field magnet-cum-position-detecting magnet 5 provided on the lower surface of the first movable yoke 43 in the turned square U-shape in the first moving element 10-1.

In order to detect only the leakage magnetic flux of N or S polarity, which is emitted from one side of the first field magnet-cum-position-detecting magnet 5, as described above, the following means has been provided. Namely, as illustrated in FIG. 4, the first field magnet-cum-position-detecting magnet 5 is set up in such a manner that it does not emit the leakage magnetic flux of N or S polarity from the other side thereof to prevent the second position sensor 9 from detecting such leakage magnetic flux.

Described more specifically, as illustrated in FIG. 4, the first turned square U-shaped movable yoke 43 for fixing the first field magnet-cum-position-detecting magnet 5 is formed for one side thereof so as to emit the leakage magnetic flux of N or S polarity from only one side of the first field magnet-cum-position-detecting magnet 5. Namely, said one side of the first turned square U-shaped movable yoke 43 is elongated in a direction to be outside of the position of the first position sensor 8 so that the first position sensor 8 can detect the leakage magnetic flux emitted from said one side of the first field magnet-cum-position-detecting magnet 5 directed perpendicularly in a direction of the stator base 2 and to form an elongated right-angle part 43a for preventing the leakage magnetic flux emitted from said one side of the first field magnet-cum-position-detecting magnet 5 from leaking through to the outside to affect adversely peripheral equipments.

Since such a elongated bent-up part 43a is formed at a relatively long distance from said one side of the first field magnet-cum-position-detecting magnet 5, the first group of the position sensors 8 can detect the leakage magnetic flux emitted from said one side of the first field magnet-cum-position-detecting magnet 5 so long as the first group of the position sensors 8 are arranged on the stator base 2 between said one side of the first field magnet-cum-position-detecting magnet 5 and the above-described elongated right angle part 43a.

In addition, in order to prevent the second group of the position sensors 9 from detecting the leakage magnetic flux of N or S polarity, which is emitted from the other side of the first field magnet-cum-position-detecting magnet 5, the other side of the first turned square U-shaped movable yoke 43 in the first moving element 10-1 is elongated in such a manner that it is located at an inner position close to the other side of the first field magnet-cum-position-detecting magnet 5 than the second position sensor 9 so as to form an elongated right-angle part 43b for preventing the leakage magnetic flux emitted from said the other side of the first field magnet-cum-position-detecting magnet 5 from leaking through to the outside to affect adversely peripheral equipments.

Since such a elongated bent-up part 43b is formed in a relatively close relation with said the other side of the first field magnet-cum-position-detecting magnet 5, a second group of the position sensors 9 do not detect the leakage magnetic flux emitted from said the other side of the first field magnet-cum-position-detecting magnet 5 because the second group of the position sensors 9 are arranged on the stator base 2 at an outside position further distant from the above-described elongated right-angle part 43b formed at said the other side of the first field magnet-cum-position-detecting magnet 5.

Besides, each of the second group of the position sensors 9 is arranged on the other side of the stator base 2 and at a position on the extension line of one available conductor portion 4a of its corresponding armature coil 4, which contributes to the generation of thrust, so as to permit the detection of only the leakage magnetic flux of N or S polarity, which is emitted from the other side of the second field magnet-cum-position-detecting magnet 6 provided on the lower surface of the second movable yoke 44 in the turned square U-shape in the second moving element 11-1.

In order to detect only the leakage magnetic flux of N or S polarity, which is emitted from the other side of the second field magnet-cum-position-detecting magnet 6, as described above, the following means has been provided. Namely, as illustrated in FIG. 5, the second field magnet-cum-position-detecting magnet 6 is set up in such a manner that it emits no leakage magnetic flux of N or S polarity from one side thereof so as to prevent the first position sensor 8 from detecting such leakage magnetic flux.

Described more specifically, as illustrated in FIG. 5, the second turned square U-shaped movable yoke 44 for fixing the second field magnet-cum-position-detecting magnet 6 is formed for one side thereof so as to emit the leakage magnetic flux of N or S polarity from only the other side of the second field magnet-cum-position-detecting magnet 6. Namely, said other side of the second turned square U-shaped movable yoke 44 is elongated in a direction to be outside of the position of the second position sensor 9 so that the second position sensor 9 can detect said leakage magnetic flux directed perpendicularly in a direction of the stator base 2 and to form an elongated right-angle part 44b for preventing the leakage magnetic flux emitted from said the other side of the second field magnet-cum-position-detecting magnet 6 from leaking through to the outside to affect adversely peripheral equipments. Since such a elongated bent-up part 44b is formed at a relatively long distance from said the other side of the second field magnet-cum-position-detecting magnet 6, the second group of the position sensors 9 can detect the leakage magnetic flux emitted from said the other side of the second field magnet-cum-position-detecting magnet 6 so long as the second group of the position sensors 9 are arranged on the stator base 2 between said the other side of the second field magnet-cum-position-detecting magnet 6 and the above-described elongated bent-up part 44b.

In addition, in order to prevent the first group of the position sensors 8 from detecting the leakage magnetic flux of N or S polarity, which is emitted from one side of the second field magnet-cum-position-detecting magnet 6, one side of the second turned square U-shaped movable yoke 44 in the second moving element 11-1 is elongated in such a manner that it is located at an inside position nearer one side of the second field magnet-cum-position-detecting magnet 6 rather than the first position sensor 8 to bend its edge portion perpendicularly in a direction of the stator base 2 so as to form an elongated right-angle part 44a for preventing the leakage magnetic flux emitted from said one side of the second field magnet-cum-position-detecting magnet 6 from leaking through to the outside to affect adversely peripheral equipments.

Since such a elongated right-angle part 44a is formed in a relatively close relation with said one side of the second field magnet-cum-position-detecting magnet 6, a first group of the position sensors 8 do not detect the leakage magnetic flux emitted from said one side of the second field magnet-cum-position-detecting magnet 6 because the first group of the position sensors 8 are arranged on the stator base 2 further away to outside from the above-described elongated right-angle part 44a formed at said one side of the second field magnet-cum-position-detecting magnet 6.

In the case of the second embodiment of this invention, the power circuit and position-detecting mechanism illustrated in FIG. 2 will also be used.

Accordingly, since the first group of the position sensors 8 are arranged so as to detect only a magnetic pole of the field magnet-cum-position-detecting magnet 5 in the first moving element 10-1, only the first moving element 10-1 can be moved. In addition, since the second group of the position sensors 9 are arranged so as to detect only a magnetic pole of the field magnet-cum-position-detecting magnet 6 in the second moving element 11-1, only the second moving element 11 can be moved. Therefore, the first moving element 10-1 and the second moving element 11-1 can be servocontrolled separately and independently to move them.

Third Embodiment of the Invention

Figure 7:
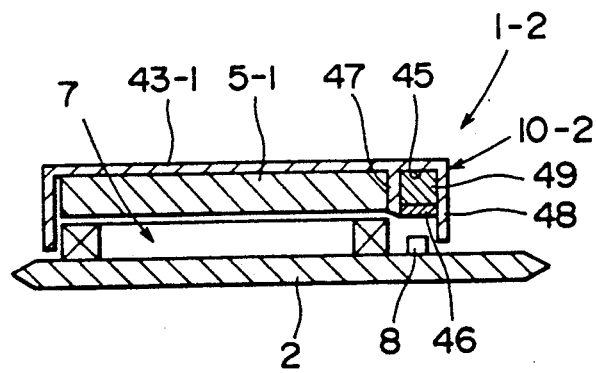
FIG. 7 is a vertical cross-section view taken on line VII—VII in FIG. 6.
Figure 6:
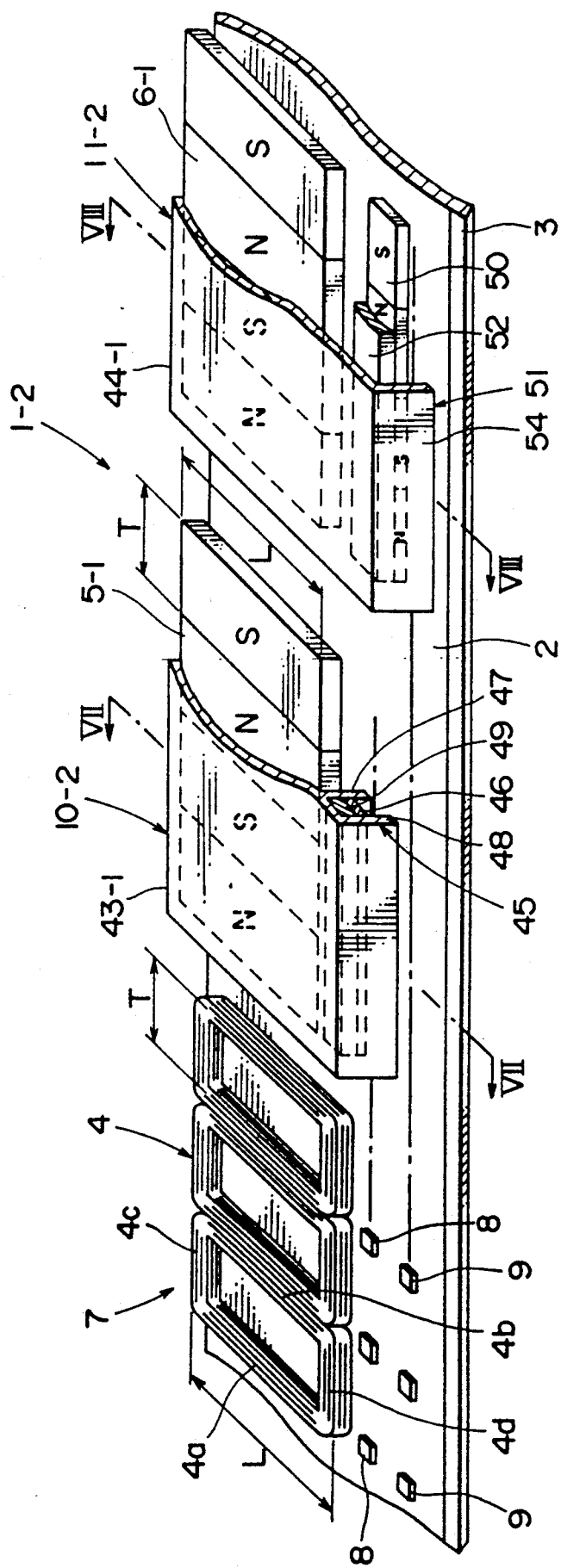
FIG. 6 is an exploded perspective view showing a principal part to illustrate the third embodiment of this invention.

FIG. 6 is a perspective view showing only a principal part of a moving-magnet type linear d.c. brushless motor 1-2 having plural moving elements to illustrate the third embodiment of this invention, FIG. 7 is a vertical cross-sectional view taken on line VII—VII in FIG. 6, and FIG. 7 is a vertical cross-sectional view taken on line VIII—VIII in FIG. 6.

The third embodiment of this invention will hereinafter be described with reference to FIGS. 6 through 8.

In FIG. 6, the moving-magnet type linear d.c. brushless motor 1-2 having plural moving element is illustrated with only two moving elements 10-2 and 11-2 for reasons of the preparation of drawings and description. Similar to the motor described above, it is also provide with a stator base 2 in the form of a long board, said stator base being composed of a magnetic material and constituting a stator yoke. On the upper surface thereof, a stator armature 7 of a coreless structure is composed in the same manner as described above.

With respect to the stator armature 7 composed by arranging a group of many coreless armature coils 4 on the stator base 2, a first group of position sensors 8 for the first moving element 10-2 and a second group of position sensors 9 for the second moving element 11-2 are disposed in two rows on one side of the stator base 2.

In this case, supposing the number of the moving elements having a position-detecting magnet, which will be described subsequently, is m (m being an integer of at least 3), it is only necessary to arrange m groups of position sensors in m rows on the stator base 2 as described above. Alternatively, supposing the number of the moving elements is m, a total of m rows of moving element groups may be arranged on both sides of the stator armature 7.

The first group of the position sensors 8 are arranged so as to face through an air-gap a first position-detecting magnet 46 attached into a first receiving groove 45 for the position-detecting magnet, which is formed by a magnetic material on one side of a first movable yoke 43-1 of the first moving element 10-2, said yoke being made of a magnetic material and being in a turned square U-shape in section.

The reason why the first position-detecting magnet 46 is provided in the above manner is that the first group of the position sensors 8 can receive the same pole signal that obtained by detecting the magnetic pole of a first thrust-generating field magnet 5-1 (Incidentally, although the thrust-generating field magnet 5-1 is the same magnet as the thrust-generating field magnet-cum-position-detecting magnet 5 in the above embodiments, the thrust-generating magnet 5-1 in this embodiment does not serve as the position-detecting magnet. Its reference character is hence altered. The same may be said of a thrust-generating field magnet 6-1 which will be described subsequently).

This receiving groove 45 is defined by a magnetic shielding wall 47, which serves to screen the magnetic flux of the thrust-generating field magnet 5-1, along one side of the thrust-generating field magnet 5-1. However, this shielding wall 47 can be made useless in essence, if another embodiment is adopted. However, in this embodiment, this shielding wall 47 is formed in order that the basic idea of this embodiment is made clear. A magnetic shielding wall 48 is also formed at an outside position a predetermined interval further distant from the shielding wall 47 to prevent the group of the second position sensors 9 from detecting the magnetic pole of the first position-detecting magnet 46.

Incidentally, although the magnetic shielding wall 48 can be made useless in other embodiments, it is provided in this embodiment because magnetic flux to reach the first group of the position sensors 8 is weakened unless used.

A seat 49 is fixed to the upper interior surface of the first receiving groove 45 for the position-detecting magnet, which has been defined by the above-described shielding walls 47 and 48. On the lower surface of the seat 49, the first position-detecting magnet 46 is provided to permit the detection of the magnetic pole of the position-detecting magnet 46 alone.

The second group of the position sensors 9, which serve the second moving element 11-2, are arranged on the stator base 2 at a position shifted outside by a width of the first receiving groove 45 for position-detecting magnet from the position of the stator base 2 on said one side of the stator armature 7 on which the first group of the position sensors 8 are arranged.

This second group of the position sensors 9 are required to detect only a magnetic pole of the second position-detecting magnet 50. For this reason, one side of the movable yoke 44-1 of the moving element 11-2, said yoke being made of a magnetic material, is extended more outside than said one side of the first movable yoke 43-1 to define a second receiving groove 51 for position-detecting magnet at an outside position the width of the first receiving groove 45 for position-detecting magnet distant from one side of a second thrust-generating field magnet 6-1.

A seat 52 is provided on the upper interior surface of the receiving groove 51. On the lower surface of the seat 52, a second position-detecting magnet 50 is fixed to cause it to face the second group of the position sensors 9 through an air-gap.

A magnetic shielding inside wall 53 defining the above receiving groove 51 serves to prevent the first group of the position sensors 8 from detecting a magnetic pole of the second position-detecting magnet 50. A magnetic shielding outside wall 54 defining the receiving groove 51 is provided to prevent the magnetic flux of the second position-detecting magnet 50 from leaking through to the outside.

Figure 8:
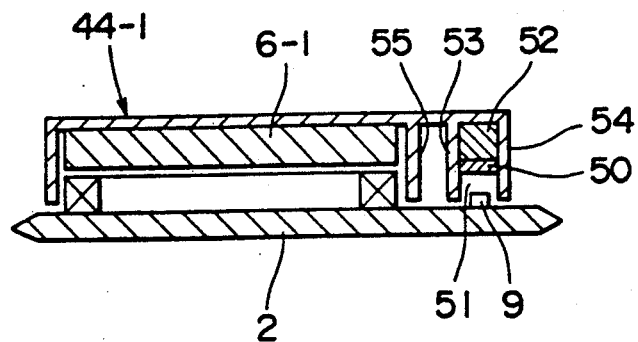
FIG. 8 is a vertical cross-sectional view taken on line VIII—VIII in FIG. 6.

As illustrated in FIG. 8, but not illustrated in FIG. 6, a magnetic shielding wall 55 for preventing the first group of the position sensors 8 from detecting the magnetic pole of the second thrust-generating field magnet 6-1 is formed near said one side of the second thrust-generating field magnet 6-1.

The above-described first and second position-detecting magnets 46 and 50 are composed as magnets having four poles of alternating N and S polarity at inphase position like the first and second thrust-generating field magnets 5-1 and 6-1 respectively, the magnetic poles of said magnets being equal in pitch to one another and having an width of T.

With respect to both power circuit and position-detecting mechanism, those illustrated in FIG. 2 are used.

Accordingly, even in the linear d.c. brushless motor 1-2 having plural moving elements, when a control signal to the effect that the first moving element 10-2 is caused to move at a predetermined speed and displacement is input in the energizing and controlling circuit by a signal from the microcomputer, this control signal is input in the first position sensor 8 through the control terminal 17. When the first position sensor 8 then detects the magnetic pole of N or S polarity of the first position-detecting magnet 46 provided on the first moving element 10-2, an output signal to that effect is output from the output terminal 24 or 30. This output signal is amplified by the operational amplifier 28 and then received by the transistor 37 or 36, whereby an electric current in a predetermined direction is caused to flow into a coreless armature coil 4. Therefore, thrust in a predetermined direction is generated by the coreless armature coil 4 and the thrust-generating field magnet 5-1 facing it, so that the first moving element 10-2 can be servocontrolled to cause it to travel under control of a feedback loop.

Similarly, when a control signal to the effect that the second moving element 11-2 is caused to move at a predetermined speed and displacement is input in the energizing and controlling circuit by a signal from the microcomputer, this control signal is input in the second position sensor 9 through the control terminal 18. When the second position sensor 9 then detects the magnetic pole of N or S polarity of the second position-detecting magnet 50 provided on the second moving element 11-2, an output signal to that effect is output from the output terminal 25 or 31. This output signal is amplified by the operational amplifier 28 and then received by the transistor 36 or 37, whereby an electric current in a predetermined direction is caused to flow into a coreless armature coil 4. Therefore, thrust in a predetermined direction is generated by the coreless armature coil 4 and the thrust-generating field magnet 6-1 facing it, so that the second moving element 11-2 can be servocontrolled to cause it to travel under control of a feedback loop.

Namely, in the third embodiment of this invention, since the first group of the position sensors 8 are arranged so as to detect only the magnetic pole of the first position-detecting magnet 46 provided on the first moving element 10-2, only the first moving element 10-2 can be moved. In addition, since the second group of the position sensors 9 are arranged so as to detect only the magnetic pole of the second position-detecting magnet 50 provided on the second moving element 11-2, only the second moving element 11-2 can be moved. Accordingly, the first moving element 10-2 and the second moving element 11-2 can be servocontrolled separately and independently to move them.

Fourth Embodiment of the Invention

Figure 9:
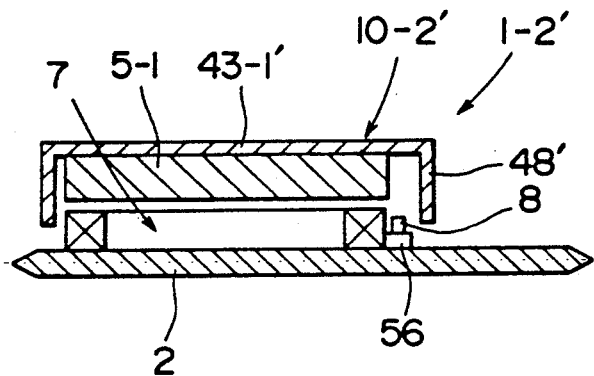
FIG. 9 is a vertical cross-sectional view showing a principal part of the portion having a first moving element in a linear d.c. brushless motor to illustrate the fourth embodiment of this invention.
Figure 10:
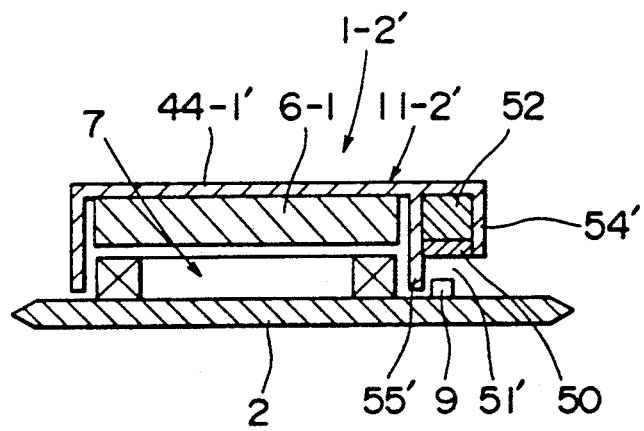
FIG. 10 is a vertical cross-sectional view showing a principal part of the portion having a second moving element in the linear d.c. brushless motor of FIG. 9

Referring to FIGS. 9 and 10, the fourth embodiment of this invention will hereinafter be described. Incidentally, in FIGS. 9 and 10, the same characters are given to the same parts as those in the third embodiment and their description is omitted. With respect to parts corresponding to those in the third embodiment, dash is put after their reference characters to describe them.

In a linear d.c. brushless motor 1-2' having plural moving elements according to the fourth embodiment of this invention, a thrust-generating magnet provided on a moving element is also used as a substitute for a position-detecting magnet to permit the reduction in the number of position-detecting magnets to be used.

Incidentally, for reasons of the preparation of drawings and description, description is given about a linear d.c. brushless motor provided with two moving element 10-2' and 11-2' face to face with a stator armature 7 in this embodiment.

In the linear d.c. brushless motor 1-2' according the fourth embodiment of this invention, the first moving element 10-2' is not equipped with a first position-detecting magnet and a first thrust-generating field magnet 5-1 is substituted for the function of the first position-detecting magnet.

Namely, the first moving element 10-2' has a structure in which the magnetic shielding wall 47, seat 49 and first position-detecting magnet 46 have been omitted from the first moving element 10-2 illustrated in FIG. 7. A magnetic shielding wall 48' of a movable yoke 43-1' is formed at a position where one side of the yoke is extended further to the outside so that the leakage magnetic flux of the first thrust-generating field magnet 5-1 is detected by the first group of the position sensors 8, which have been arranged on a stator base 2 between the magnetic shielding wall 48' and one side of the first thrust-generating field magnet 5-1, whereby the first position-detecting magnet 46 illustrated in FIG. 7 can be omitted.

By the way, in order to facilitate to detect the leakage magnetic flux of the first thrust-generating field magnet 5-1, seats 56 are fixed on the stator base 2, on which the first group of the position sensors 8 are arranged.

The first moving element 10-2' has been formed in the above manner. Therefore, in the second moving element 11-2', the groove between the magnetic shielding walls 53 and 55, which has been defined in the movable yoke 44-1 illustrated in FIG. 8, can be omitted to make the breadth of a second movable yoke 44-1' narrow, and a receiving groove 51' for position-detecting magnet is defined by magnetic shielding walls 55' and 54' as illustrated in FIG. 10.

Namely, in the fourth embodiment of this invention, since the first group of the position sensors 8 are arranged so as to detect only the magnetic pole of the first thrust-generating field magnet 5-1 of the first moving element 10-2', only the first moving element 10-2' can be moved. In addition, since the second group of the position sensors 9 are arranged so as to detect only the magnetic pole of the position-detecting magnet 50 provided on the second moving element 11-2', only the second moving element 11-2' can be moved. Accordingly, the first moving element 10-2' and the second moving element 11-2' can be servocontrolled separately and independently to move them.

Fifth Embodiment of the Invention

In the fifth embodiment, the same characters are also given to the same parts as those in the third embodiment and their description is omitted.

In the above-described embodiments, linear d.c. brushless motors having two moving elements have been described. Needless to say, three or more moving elements may be provided. In this embodiment, a motor having three moving elements is illustrated. In addition, in the above-described embodiments, the examples, in which only one sides of the field magnets (5-1, 6-1), moving elements (10-1, 11-1, etc.) and stator armature 7 having the armature coils 4 are effectively used, have been principally described. However, the fact that the other sides of the field magnets (5-1, 6-1), moving elements (10-1, 11-1, etc.) and stator armature 7 having the armature coils 4 may be used effectively has been already described in the third embodiment.

This embodiment illustrates an example in which a third moving element 57 and the other side of the stator armature 7 have been used effectively.

Figure 11:
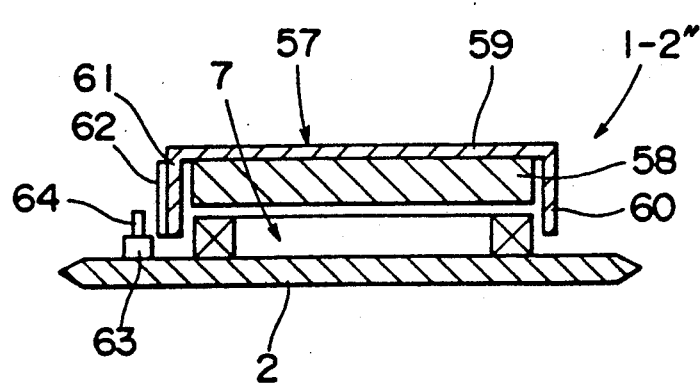
FIG. 11 is a vertical cross-sectional view showing a principal part of the portion having a third moving element in a linear d.c. brushless motor to illustrate the fifth embodiment of this invention.

Brief description of such an example is given by a linear d.c. brushless motor 11-2" having three moving element of the first and second moving elements illustrated in the third embodiment and a third moving element 57 and illustrated in FIG. 11.

FIG. 11 is a vertical cross-sectional view of a linear d.c. brushless motor illustrating a state that the coreless stator armature 7 faces the third moving element 57 and viewed on the basis of the traveling direction of the third moving element 57. A third position-detecting magnet 62, which has been magnetized like a thrust-generating field magnet, is fixed to the outer surface of a magnetic shielding wall 61, which is a wall on the other side among magnetic shielding walls 60 and 61 formed on both sides of a movable yoke 59 supporting a third thrust-generating magnet 58 and made of a magnetic material, and a third group of position sensors 64 are arranged on seats 63, which have been provided fixedly on the stator base 2 so that the magnetic pole of the third position-detecting magnet 62 can be detected.

Namely, in the fifth embodiment of this invention, since the first group of the position sensors 8 are arranged so as to detect only the magnetic pole of the first position-detecting magnet 46 provided on the first moving element 10-2 (see FIG. 7), only the first moving element 10-2 can be moved. In addition, since the second group of the position sensors 9 are arranged so as to detect only the magnetic pole of the second position-detecting magnet 50 provided on the second moving element 11-2 (see FIG. 8), only the second moving element 11-2 can be moved. Moreover, since the group of the third position sensors 64 are arranged so as to detect only the magnetic pole of the third position-detecting magnet 62 provided on the third moving element 57, only the third moving element 57 can be moved. Accordingly, the first moving element 10-2, the second moving element 11-2 and the third moving element 57 can be servocontrolled separately and independently to move them.

ADVANTAGES OF THE INVENTION

As apparent from the above description, according to the present invention, even when a linear d.c. brushless motor has plural moving elements, the plural moving elements can be controlled separately and independently to cause them travel without any wrong operation.

In addition, since the group of the position sensors for the nth moving element can detect only the magnetic pole of the thrust-generating field magnet or thrust-generating field magnet-cum-position-detecting magnet provided on the nth moving element and other groups of the position sensors for other moving elements cannot detect the magnetic pole of the thrust-generating field magnet or thrust-generating field magnet-cum-position-detecting magnet provided on the -nth moving element, a troublesome means that n groups of the position sensors for n moving elements are switched by a mechanical change-over switch mechanism becomes useless. Accordingly, the linear d.c. brushless motors according to this invention is very simple in structure and hence can be fabricated economically. Moreover, even when plural moving elements are used for a motor, the moving elements can be controlled separately and independently by an extremely simple structure to cause them to travel. Therefore, its applications become widened to a great extent compared to those having only one moving element, and useful motors suitable for use in various equipments can hence be provided.

What is claimed is:

1. A moving-magnet type linear d.c. brushless motor having plural moving elements, which comprises:
    a stator armature provided along a traveling track of moving elements;
    n moving elements, each including a thrust-generating field magnet having an arrangement of P contiguous magnetic poles of alternating N and S polarity, where n is an integer of at least 2 and P is an integer of at least 1, the moving elements being face to face with the stator armature and traveling separately and independently;
    n position-detecting magnets, which are provided respectively on said n moving elements each of the position-detecting magnets having P magnetic poles of N and S polarity at in-phase position relative to the thrust-generating field magnets and substantially the same pitch as that between N and S magnetic poles in each of the thrust-generating field magnets; and
    n groups of position sensors, each group facing a corresponding one of the position-detecting magnets, and detecting signals from the magnetic poles of the corresponding position-detecting magnet, so that in accordance with respective detected signals of positions of the poles of the position-detecting magnets from said respective group of the position sensors, an electric current is caused to flow into the stator armature facing the thrust-generating field magnet of said moving element having said position-detecting magnet so as to generate thrust, which causes said detected moving element to move in a predetermined direction, whereby said moving elements are energized and controlled to travel separately and independently.

2. The moving-magnet type linear d.c. brushless motor as claimed in claim 1, wherein the thrust-generating field magnets are also used as said position-detecting magnets without separately providing any position-detecting magnets.

3. A moving-magnet type linear d.c. brushless motor having plural moving elements, said motor comprising:
    a stator armature provided along a traveling track of moving elements, the armature having opposite sides;
    first and second moving elements having respective first and second thrust-generating field magnet-cum-position-detecting magnets with contiguous poles of alternating N and S polarity face to face with the stator armature, said elements being movable separately and independently;
    a first group of position sensors provided on one side of the stator armature so as to detect only the N or S magnetic pole of the first thrust-generating field magnet-cum-position-detecting magnet in the first moving element, so that when the first group of the position sensors detects an N or S pole of the first thrust-generating field magnet-cum-positiondetecting magnet in the first moving element, an electric current is caused to feed to the stator armature facing the field magnet in the first moving element so as to generate thrust by which the first moving element is caused to travel in a predetermined direction; and a second group of position sensors provided on the other side of the stator armature so as to detect only the N or S magnetic pole of the second thrust-generating field magnet-cum-position-detecting magnet in the second moving element, so that when the second group of the position sensors detects an N or S pole of the second thrust-generating field magnet-cum-position-detecting magnet in the second moving element, an electric current is caused to feed to the stator armature facing the field magnet in the second moving element so as to generate thrust by which the second moving element is caused to travel in a predetermined direction.

4. The moving-magnet type linear d.c. brushless motor as claimed in claim 3, wherein the first thrust-generating field magnet-cum-position-detecting magnet provided on the first moving element is arranged on the first moving element with it shifted in the direction of one side of the stator armature and the second thrust-generating field magnet-cum-position-detecting magnet provided on the second moving element is arranged on the second moving element with it shifted in the direction of the other side of the stator armature.

5. A moving-magnet type linear d.c. brushless motor having plural moving elements, said motor comprising:

a stator armature provided along a traveling track of moving elements;

first and second moving elements having respective first and second thrust-generating field magnets with contiguous poles of alternating N and S polarity face to face with the stator armature, said elements being movable separately and independently;

said respective thrust-generating field magnets being located on the same traveling track without shifting their positions from each other in directions perpendicular to the traveling direction of the moving elements, the first moving element emitting leakage magnetic flux from one side of its thrust-generating field magnet, but not emitting leakage magnetic flux from the other side thereof, the second moving element not emitting leakage magnetic flux from one side of its thrust-generating field magnet, but emitting leakage magnetic flux from the other side thereof, a first group of position sensors provided on one side of the stator armature so as to detect only the leakage magnetic flux of N or S polarity, which is emitted from the thrust-generating field magnet in the first moving element, so that when the first group of the position sensors detects the leakage magnetic flux of an N or S pole, which is emitted from the thrust-generating field magnet in the first moving element, an electric current is caused to feed to the stator armature facing the thrust-generating field magnet in the first moving element so as to generate thrust by which the first moving element is caused to travel in a predetermined direction, and a second group of position sensors provided on the other side of the stator armature so as to detect only the magnetic flux of N or S polarity, which is emitted from the other side of the thrust-generating field magnet in the second moving element, so that when the second group of the position sensors detects the leakage magnetic flux of an N or S pole, which is emitted from the thrust-generating field magnet in the second moving element, an electric current is fed to the stator armature facing the thrust-generating field magnet in the second moving element so as to generate thrust by which the second moving element is caused to travel in a predetermined direction.

6. The moving-magnet type linear d.c. brushless motor as claimed in claim 1, wherein each of said n position-detecting magnets is provided at a position on its corresponding moving element in such a manner that the traveling tracks according to traveling of the moving elements are in positions different from one another, and said n groups of position sensors are separately provided at positions different from one another on the side of the stator armature so as to face said n position-detecting magnets respectively, so that each of the position sensor groups detects only its corresponding position-detecting magnet.

7. The moving-magnet type linear d.c. brushless motor as claimed in claim 6, wherein each of said n position-detecting magnets is positioned on its corresponding moving element in such a manner that the traveling tracks according to traveling of the moving elements are in positions different from one another, and said n groups of position sensors are separately provided at positions different from one another on the side of the stator armature facing said n position-detecting magnets respectively, each of the groups of position sensors being magnetically isolated from the position-detecting magnets other than the corresponding position-detecting magnet, so that each group of the position sensors detects only its corresponding position-detecting magnet.

8. The moving-magnet type linear d.c. brushless motor as claimed in claim 7, wherein at least one of said n position-detecting magnets comprises a thrust-generating field magnet.

9. A moving-magnet type linear d.c. brushless motor having plural moving elements on a traveling track, comprising:

a stator armature on the traveling track;

n moving elements, each including a thrust-generating field magnet having P contiguous magnetic poles of alternating N and S polarity, where n is an integer greater than 1 and P is an integer of at least 1, the moving elements having one side facing the stator armature and traveling separately and independently along the traveling track;

a plurality of position-detecting magnets, each corresponding to a different one of the moving elements and having P magnetic poles of N and S polarity at in-phase positions of substantially the same pitch relative to the poles of the thrust-generating magnets; and position detecting means including a group of position sensors corresponding to each position-detecting magnet for generating an electric current in the stator armature to move the moving elements in predetermined directions separately and independently, each position sensor detecting the magnet poles of only the correspondingly position-detecting magnet.

* * * * *

UNITED STATES PATENT AND TRADEMARK OFFICE
CERTIFICATE OF CORRECTION

PATENT NO. : 5,023,495

DATED : June 11, 1991

INVENTOR(S) : MASAYUKI OHSAKA ET AL.

It is certified that error appears in the above-identified patent and that said Letters Patent is hereby corrected as shown below:

Title Page, Assignee, change "Hitachi Metals & Shicoh Engine" to --Hitachi Metals, Ltd. & Shicoh Engineering Co., Ltd.--

Claim 9, column 22, line 66, change "correspondingly" to --corresponding--.

Signed and Sealed this

Nineteenth Day of May, 1992

Attest:

DOUGLAS B. COMER

*Attesting Officer*    *Acting Commissioner of Patents and Trademarks*